US009015345B2

(12) United States Patent
O'Shea et al.

(10) Patent No.: US 9,015,345 B2
(45) Date of Patent: Apr. 21, 2015

(54) API SUPPORTING SERVER AND KEY BASED NETWORKING

(75) Inventors: Gregory O'Shea, Cambridge (GB); Austin Donnelly, Cambridge (GB); Antony Rowstron, Cambridge (GB); Paolo Costa, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 12/969,181

(22) Filed: Dec. 15, 2010

(65) Prior Publication Data
US 2012/0158998 A1 Jun. 21, 2012

(51) Int. Cl.
G06F 15/16 (2006.01)
H04L 29/14 (2006.01)
H04L 29/06 (2006.01)
H04L 29/08 (2006.01)

(52) U.S. Cl.
CPC ............... *H04L 69/40* (2013.01); *H04L 69/14* (2013.01); *H04L 67/1038* (2013.01)

(58) Field of Classification Search
CPC ....................................................... G06F 15/16
USPC .................................................. 709/245, 239
See application file for complete search history.

(56) References Cited

U.S. PATENT DOCUMENTS

| 5,983,265 A * | 11/1999 | Martino, II .................... 709/206 |
| 7,324,519 B2 * | 1/2008 | Montuno et al. .............. 370/392 |
| 7,747,895 B2 | 6/2010 | Archer et al. |
| 7,757,236 B1 | 7/2010 | Singh |
| 8,140,864 B2 * | 3/2012 | Osaki ............................ 713/193 |
| 2002/0080755 A1 * | 6/2002 | Tasman et al. ................ 370/338 |
| 2003/0056094 A1 * | 3/2003 | Huitema et al. .............. 713/157 |
| 2008/0101381 A1 * | 5/2008 | Sun et al. .................. 370/395.54 |
| 2010/0180048 A1 | 7/2010 | Guo et al. |

OTHER PUBLICATIONS

Abu-Libdeh, et al., "Symbiotic Routing in Future Data Centers", retrieved on Oct. 12, 2010 at <<http://research.microsoft.com/en-us/um/people/antr/Publications/sigcomm10-camcube.pdf>>, ACM SIGCOMM Conference, New Delhi, India, Aug. 2010, pp. 51-62.
Beaver, et al., "Finding a needle in Haystack: Facebook's photo storage", USENIX Association, Proceedings of Conference on Operating Systems Design and Implementation (OSDI), 2010, pp. 1-14.

(Continued)

*Primary Examiner* — David Lazaro
*Assistant Examiner* — Marie Georges Henry
(74) *Attorney, Agent, or Firm* — Steve Wight; Judy Yee; Micky Minhas

(57) ABSTRACT

An application programming interface (API) supporting server and key based networking is described. In an embodiment, the API receives either a key or a server address from a service running on a server in a direct-connect topology and returns data which identifies suitable next hops for transmission of a packet of data which has a destination of the received server address or of a server address which is encoded within the received key. In another embodiment, the key also encodes information specifying alternative server addresses for use in the event that the original server is unreachable. This information may also be used to define servers for replication of the key. A further embodiment describes a method of queuing packets for transmission against multiple links, where the packet is transmitted on the first available link and at this time is removed from the queues for the other links.

19 Claims, 6 Drawing Sheets

(56) References Cited

OTHER PUBLICATIONS

Castro, et al., "SplitStream: High-Bandwidth Multicast in Cooperative Environments", ACM, Proceedings of Symposium on Operating Systems Principles (SOSP), Bolton Landing, New York, Oct. 2003, pp. 298-313.

Costa, et al., "Why Should We Integrate Services, Servers, and Networking in a Data Center?", ACM, Proceedings of Workshop on Research on Enterprise Networking (WREN), Barcelona, Spain, Aug. 21, 2009, pp. 111-118.

Dabek, et al., "Towards a Common API for Structured Peer-to-Peer Overlays", retrieved on Oct. 12, 2010 at <<http://citeseerx.ist.psu.edu/viewdoc/download?doi=10.1.1.12.5202&rep=rep1&type=pdf>>, Proceedings of Intl Workshop on Peer-to-Peer Systems (IPTPS), Berkeley, California, Feb. 2003, pp. 1-6.

DeCandia, et al., "Dynamo: Amazon's Highly Available Key-value Store", ACM, Proceedings of Symposium on Operating Systems Principles (SOSP), Stevenson, Washington, Oct. 2007, pp. 205-220.

Fitzpatrick, "Distributed caching with Memcached", Specialized Systems Consultants, Inc. Seattle, WA, Linux Journal, vol. 124, Aug. 2004, pp. 1-6.

Garza, "Project CamCube", retrieved on Oct. 12, 2010 at <<http://www.windows7news.com/2010/09/01/project-camcube/>>, Windows 7 News and Tips, Sep. 1, 2010, pp. 1-8.

Gummadi, et al., "The Impact of DHT Routing Geometry on Resilience and Proximity", ACM, Proceedings of Conference on Applications, Technologies, Architectures, and Protocols for Computer Communications (SIGCOMM), Karlsruhe, Germany, Aug. 2003, pp. 381-394.

Lakshman, et al., "Cassandra—A Decentralized Structured Storage System", ACM SIGOPS Operating Systems Review (OSR), vol. 44, No. 2, Apr. 2010, pp. 35-40.

Moon, "Achieving Flexibility and Performance for Packet Forwarding and Data Center Management", retrieved on Oct. 12, 2010 at <<http://www.eecs.berkeley.edu/Pubs/TechRpts/2010/EECS-2010-66.pdf>>, University of California at Berkeley, PhD. Dissertation and Technical Report UCB/EECS-2010-65, May 12, 2010, pp. 1-84.

Popescu, et al., "Routing in Content Addressable Networks: Algorithms and Performance", retrieved on Oct. 12, 2010 at <<http://194.47.129.80/fou/Forskinfo.nsf/774bac3cad4d3e9bc125681600506a87/83e2da713ffaedf9c12575d2002b5e1f/$file/paper_itcss-12.pdf>>, ITC-Specialist Seminar, Hoi An, Vietnam, 2009, pp. 1-7.

Ramasubramanian, et al., "Beehive: O(1) Lookup Performance for Power-Law Query Distributions in Peer-to-Peer Overlays", USENIX Association, Proceedings of Symposium on Networked Systems Design and Implementation (NSDI), vol. 1, 2004, pp. 1-14.

Ratnasamy, et al., "A Scalable Content-Addressable Network", ACM, Proceedings of Conference on Applications, Technologies, Architectures, and Protocols for Computer Communications (SIGCOMM), San Diego, California, Aug. 2001, pp. 161-172.

Rowstron, et al., "Camcube: A novel data center", Microsoft Research, Cambridge, Trilogy Workshop, Jul. 2010, pp. 1-26.

Rowstron, et al., "Pastry: Scalable, decentralized object location and routing for large-scale peer-to-peer systems", Springer-Verlag London, Proceedings of IFIP/ACM/USENIX Intl Conference on Distributed Systems Platforms (Middleware), Heidelberg, Germany, Nov. 2001, pp. 329-350.

Rowstron, et al., "Storage management and caching in PAST, a large-scale, persistent peer-to-peer storage utility", Proceedings of ACM, Proceedings of Symposium on Operating Systems Principles (SOSP), Canada, Nov. 2001, pp. 188-201.

Stoica, et al., "Chord: A Scalable Peer-to-peer Lookup Protocol for Internet Applications", ACM, Proceedings of Conference on Applications, Technologies, Architectures, and Protocols for Computer Communications (SIGCOMM), San Diego, California, pp. 1-14.

* cited by examiner

US 9,015,345 B2

API SUPPORTING SERVER AND KEY BASED NETWORKING

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Data centers supporting user-facing applications, such as email applications, or other applications like large-scale data processing, usually run a set of internal services that provide basic functionality on which to build the higher-level applications. The computer clusters used to run these services rely on general purpose network technology such as Ethernet switches and Internet protocols whose limitations and compromises, in terms of design and implementation, limit the performance and functionality of the services that run upon them. Examples of issues include bandwidth oversubscription and, where TCP/IP is used, TCP throughput collapsing as the small buffers are overrun.

The embodiments described below are not limited to implementations which solve any or all of the disadvantages of known methods of communication within a computer cluster.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An application programming interface (API) supporting server and key based networking is described. In an embodiment, the API receives either a key or a server address from a service running on a server in a direct-connect topology and returns data which identifies suitable next hops for transmission of a packet of data which has a destination of the received server address or of a server address which is encoded within the received key. In another embodiment, the key also encodes information specifying alternative server addresses for use in the event that the original server is unreachable. This information may also be used to define servers for replication of the key. A further embodiment describes a method of queuing packets for transmission against multiple links, where the packet is transmitted on the first available link and at this time is removed from the queues for the other links.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
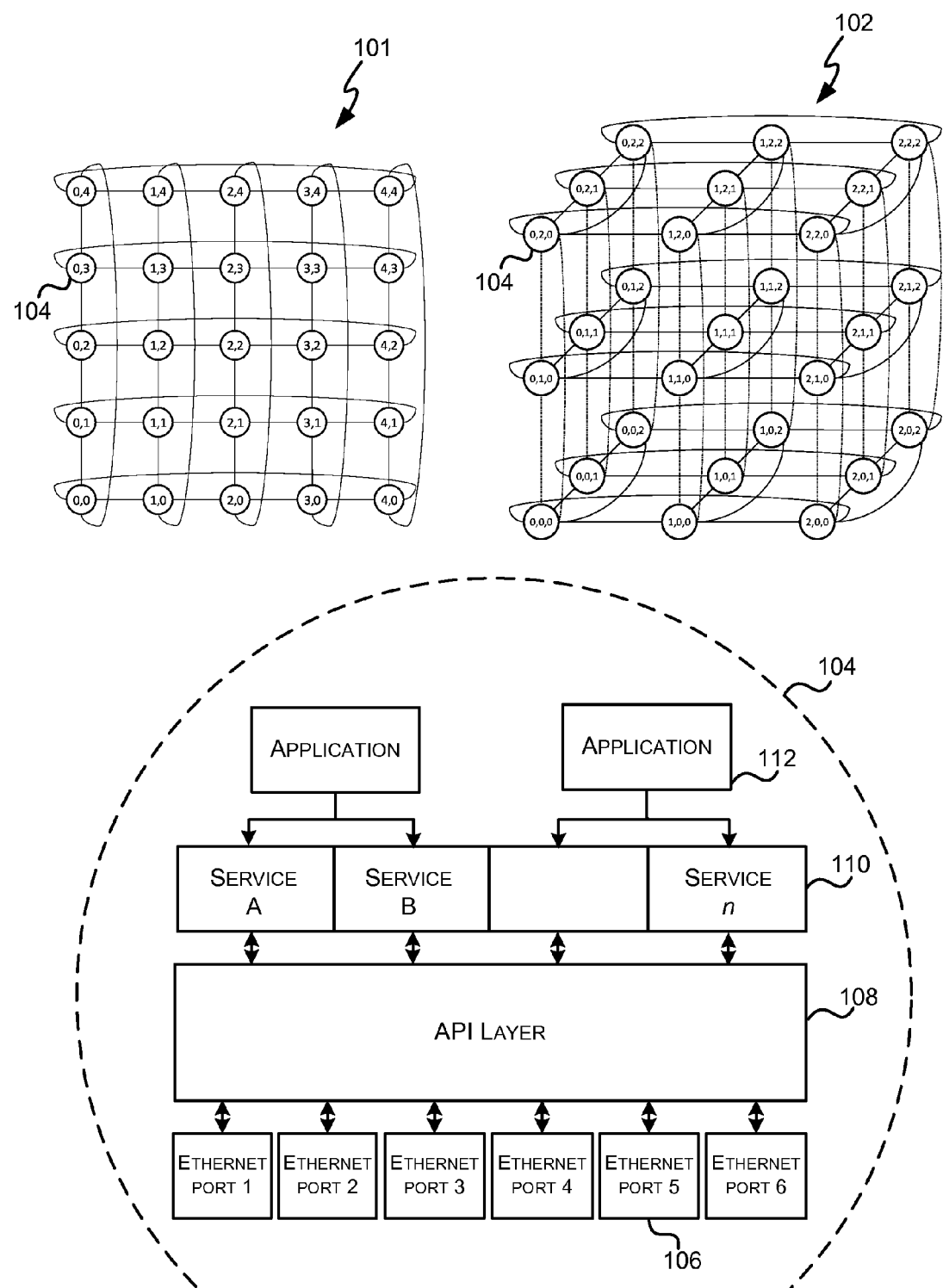
FIG. 1 shows examples of a data center cluster architecture and a schematic diagram of a server within such an architecture.

FIG. 1 is a schematic diagram showing two examples 101, 102 of a data center cluster architecture which each comprise an n-dimensional direct-connect network created by directly connecting servers (each represented by a circle 104) to other servers using point to point connections. The first example 101 comprises a 2D, 5-ary network topology where each node (which comprises a computing entity acting as a server) is represented by a circle 104 containing its 2D coordinate and has four point to point connections to other nodes. The second example 102 comprises a 3D, 3-ary network topology (also referred to as a 3D torus topology) which may also be visualized as a wrapped 3D mesh with each server connected to six other servers. Again each node is represented by a circle 104 containing its coordinate, this time in three dimensions. This topology provides a high degree of multi-path which makes it very resilient to link and server failure. The API and methods described below may be implemented on any cluster comprising a direct connect topology and FIG. 1 shows just two examples. Further examples include a butterfly network, hypercube, a ring of servers or a line of servers (which are not wrapped to form a ring). The network may comprise multi-path (as in the examples shown in FIG. 1), but the API may also be implemented in networks without multi-path. The networks may be anywhere in size from small networks (e.g. rack size networks) to very large networks (e.g. shipping container size networks).

FIG. 1 also shows a schematic diagram of one of the servers (which may be built from commodity components) and in this case a server from the second example architecture 102 is shown because it comprises six ports 106 (which in this example are gigabit Ethernet ports), one for each of the direct connections in the direct-connect topology. Servers may be linked by cross-over cables between ports in each server and as there are only two servers sending packets over each link, the packets do not interfere. An API (application programming interface) layer 108 encapsulates a custom network stack comprising a user-mode component interacting with a kernel driver and the API is used for intra-cluster traffic. A number of services 110 (which may be written in user-mode code) run on each server and the API provides an interface between services running on the same server or on different servers and/or between the service and functionality which is implemented in the API itself or within the server platform. In an example implementation, the services are partitioned horizontally, e.g. all servers run an instance of the service, there is a minimum subset of services which are always running on a server and the API exposes the functionality of these services to other services running on the same server. Each server may have a unique address and a packet header may act as a service identifier such that when the runtime receives a packet it uses the header to de-multiplex the packet and deliver it to the correct service. Services include their own headers in the packet. The functionality provided by services and exposed by the API may comprise one or more of: multi-hop routing, keyspace management and link failure detection.

In an example implementation, some of the servers within the cluster may also be connected to another network (e.g. an IP-based packet switched network) in order to communicate with external clients and such servers may comprise an additional port (not shown in FIG. 1) for communication with that other network.

In the clusters shown, the address of servers is fixed and a server is assigned its address using its location in the physical topology. A server address can be encoded in a variety of ways which may be used interchangeably: using a node identifier structure that explicitly gives its coordinate in the 1D/2D/3D space (e.g. an (x,y,z) coordinate in a 3D example such as example 102 in FIG. 1), a server index representing an offset into the ordered set of server addresses in the cluster, or it can be encoded within a key which comprises an integer value from which the server address can be recovered and the use of a key is described in more detail below. In the following description, references to server address refer to use of either a coordinate or server index and these may be used interchangeably.

Where a coordinate is used, the 1D/2D/3D topology of the cluster is used to define a coordinate space and when the cluster is commissioned, a bootstrap service assigns each server a coordinate (an (x,y) coordinate in the first example 101 and an (x,y,z) coordinate in the second example 102) representing its offset within the topology from an arbitrary origin. In FIG. 1 the coordinates of a node are shown within the circle 104. A bootstrap service on each server exposes the coordinate and dimensions of the topology (e.g. the 3D torus in example 102) to local services 110 and also provides a mapping between the one-hop neighbors and their coordinates. The coordinates of one-hop neighbors will each differ in only one axis and by +/−1 modulo the axis size. The assigned coordinate is the address of the server and once assigned a server's identifier is not changed.

As detailed above, for a particular server, its address in the form of a server coordinate and its address in the form of a server index are completely interchangeable. A server index may be generated by enumerating all servers from 0 to N−1 by applying a deterministic mapping between the coordinates (e.g. (x,y,z) coordinates) and [0 . . . N−1]. For example, if a server has address in the form of a coordinate (x,y,z) then it also has server index (x*MaxX*MaxY)+(y*MaxY)+z where MaxX and MaxY are the lengths of those axes.

The API provides a keyspace where, while the key appears to a user as a flat address, each key has structure such that a function exists which maps a key or a portion of a key (e.g. n of m bits, where the "bits" may be fractional bits) onto a server address (this may be referred to as the home server which is responsible for that key). In an example, a key may be considered a 160-bit key, but only the least significant 64-bits may be used when routing a message to a key. Of those 64-bits, the highest bits (of the 64-bit key) generate the server address in the form of a server index or server coordinate (e.g. an (x,y,z) coordinate in the 3D torus example 102).

In a very simple example, a key may be 011 and the first two bits 0 and 1 may define the address of the home server (which may also be referred to as the root or primary server). In another example, if the keys are 64-bit integers, the following constant may be computed:

$$\text{KeysPerServer}=\text{ceil}(2^{64}/\text{TotalServersInNetwork})$$

where ceil(x) returns the smallest integer which is greater than or equal to x (e.g. ceil(2.7)=3). The address of the home server, in the form of a server index, can then be computed from a key using:

$$\text{HomeServer}=\text{floor}(\text{key}/\text{KeysPerServer})$$

where floor(x) returns the largest integer which is less than or equal to x (e.g. floor(2.7)=2). This may be considered a scheme which uses a portion of the key (n of m bits, where m=64) as dividing the key by KeysPerServer is equivalent to selecting just the n-most significant bits of the key. Since KeysPerServer is most likely not a power of 2, then n will be a "fractional" number of bits, e.g. for 27 servers then n is approximately 4.75488 bits since $2^{4.75488} \approx 27$. In other examples alternative algorithms may be used to compute a server address from a key.

Figure 2:
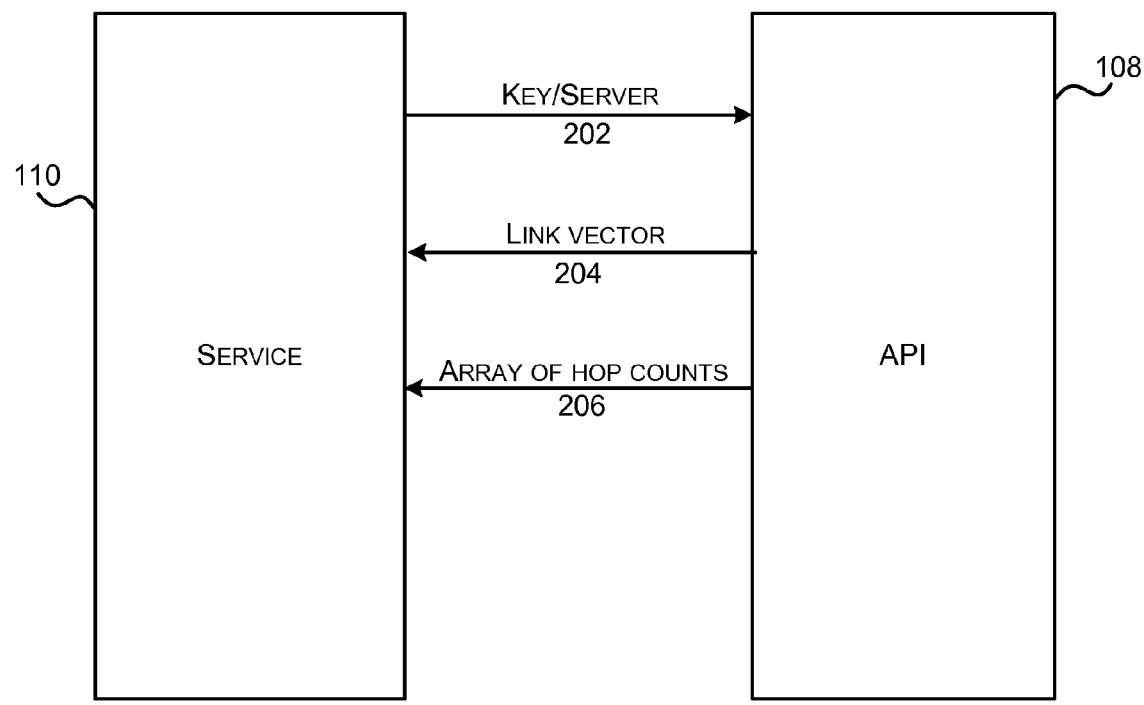
FIGS. 2-4 are schematic diagrams of various aspects of an API within such a data center cluster architecture.

As described above, the API exposes a number of functions to services and the API is configured such that all functions work consistently irrespective of whether they are supplied with a key or a server address. One such function which the API supports is multi-hop routing to keys and server addresses and this uses a link-state routing protocol and shortest-paths algorithm. Each service implements its own queues and services query the API to determine the set of outbound links that can be used to forward a packet towards a key or server (arrow 202). As shown in the schematic diagram of FIG. 2, the set of one-hop neighbors that can make progress towards the destination is returned in the form of a link vector (arrow 204). The link vector comprises a vector of link indices (e.g. 0-5 for the 3D torus example 102 of FIG. 1) where bits are set to identify candidate next hops to the specified destination, each of which is an equally good next hop to the server/key in terms of total path length, i.e. the link vector identifies a subset of links (e.g. which may be between one and six links in the 3D torus example 102 of FIG. 1) offering a shortest path to the specified destination. In this example, the API is arranged to support only communication with one-hop neighbors. If routing to a server which is not reachable, an error is returned (not shown in FIG. 2).

Using the link vector, services can then select a link or a set of links (as described below with reference to FIG. 5) and forward packets recursively within the cluster from server to server (e.g. on the one of the set of links which is available first) until a packet reaches its destination. When a packet is received from the network at the destination, the API may identify to the receiving services which link the packet arrived on using the index number of that link. Services take responsibility for packet forwarding at each intermediate hop towards the destination. Services running on servers on the path may be able to intercept and arbitrarily modify or manipulate a packet while it is being routed to a destination server or key. Such packet manipulation may be in order to satisfy requirements of the service, e.g. to implement their own routing protocols and transport protocols which may be optimized to provide specific properties that a service requires. Multiple (independent) routing and transport protocols can therefore be used concurrently within the cluster. Packet manipulation may be used to perform on-path data aggregation and to provide increased efficiency.

The following API code extracts provide an example implementation of this functionality:

```
/// <summary>
/// Return a link vector of link indices (0-5), each of which is an
/// equally good next hop to "server" (in terms of total path length).
/// If "server" is unreachable, returns NoRouteToHost.
/// If "server" is this server, returns LoopbackRequired.
/// Callable on any thread.
/// </summary>
/// <param name="serverIdx">The destination (may be multiple hops
/// away)</param>
/// <returns></returns>
public int GetAllNextHopsForServer(int serverIdx)
/// <summary>
/// Return the link vector for the next hops towards the primary for "key".
/// Moderately heavyweight locking ensures that you get a consistent
/// snapshot of the world.
/// </summary>
/// <param name="key">Key to route to.</param>
/// <returns>Link vector for the next hops to use</returns>
public int GetAllNextHopsForKeyPrimary(UInt64 key)
```

The generation of the link vectors may be implemented by the API itself or by a routing service on the server and standard techniques for routing may be used to identify the individual next hops. The API call 'GetAllNextHopsForKeyPrimary (key)' is equivalent to using two API calls GetAllNextHopsForServer(GetKServersForKey(key, 1)) but with stronger locking.

As part of the multi-hop routing functionality which is exposed by the API, the API is arranged to return an array of hop counts (arrow 206), one hop count for each link index (e.g. link indices (0 ... 5)) where each element in the array is the minimum number of hops to get from this server to the destination server via the particular link index. As shown in the API code extract which is provided below by way of example only, there are two error conditions, one where the destination server is the current server, which returns LoopbackRequired, and the other where the server is unreachable by any of the next-hop neighbors.

```
/// <summary>
/// Returns an array of 6 hop counts, one for each link index (0...5).
/// Each element is the minimum number of hops to get from this server to
/// <paramref name="serverIdx"/> via that link index. Note that there are
/// two error conditions: all 6 elements may be NoRouteToHost, or all 6
/// elements may be LoopbackRequired.
/// </summary>
/// <param name="serverIdx">The destination server index</param>
/// <returns>Array of 6 hop counts >0, or NoRouteToHost or
LoopbackRequired</returns>
public int[ ] GetMinHopCountsForServer(int serverIdx)
```

Where routing is to a key rather than a server address, an example implementation may use two API calls:

GetMinHopCountsForServer(GetServerForKey(key))

The use of a keyspace where the physical and virtual topologies are the same (i.e. where one link in an overlay topology defined by the keys represents a single link in the underlying physical topology, rather than representing multiple links in the physical network as is usually the case) and the fact that the API is configured so that all functions work on both the key and the server address makes it easier to write key-based applications (e.g. applications 112 in FIG. 1).

As described above, the API provides a keyspace where each key has structure. In addition to a function which maps a key or a portion of the key to the server address of the home server which is responsible for that key, the key may further comprise a portion which provides fail-over information in the event that the home server (e.g. as identified by the n of m bits) has failed. When a home server is unreachable, a portion of the key, e.g. the remainder of the m bit (e.g. 64-bit) key, may be used to determine the coordinate of the server which will be the replacement home and will be responsible for the key. Using this technique, the key to server mapping is consistent across all servers and the system is able to handle cascading server failures.

Expanding the very simple example used above, a key may be 011 and the first two bits 0 and 1 may define the address of the home server (e.g. server 42) The third bit 1 then defines the responsible server if server 42 is down (e.g. server 13). This third bit (or the remaining m-n bits in the earlier terminology) also defines how the whole address space is explored (in a deterministic way) in the event of failure, e.g. which server becomes the responsible server if the replacement server 13 is also down or subsequently fails.

In another example a number of probe orders may be defined, where each probe order controls how the server coordinate space is explored in the event of failure. The keyspace is therefore further divided into a number of sectors, where each sector has its own probe order which is different from all the other probe orders and hence the number of sectors is defined by the number of probe orders. The sectors may be defined such that they do not overlap, and in an example, the $2^{64}$ bit number space may be visualized as being the face of a clock, with 0 at midnight, and $2^{64}-1$ just a fraction anticlockwise of midnight. This number space is divided into TotalServersInNetwork equal-sized portions, and each of those is further subdivided into NumSectors equal-sized sectors.

In a 3D example, a list of the following six (x,y,z) directions may be used as a first probe order:

[(xd, 0, 0) for xd in $\{-1, +1\}$
(0, yd, 0) for yd in $\{-1, +1\}$
(0, 0, zd) for zd in $\{-1, +1\}$]

The five other rotations of this basic list may then be used as five other probe orders, where a rotation of a list is defined as being a new list which contains all the elements of the original list, but shifted by a certain number of positions, e.g.:

Rotate([10, 20, 30], 1)->[20, 30, 10] (a rotation of 1 slot)
Rotate([10, 20, 30], 2)->[30, 10, 20] (a rotation of 2 slots)

This gives six probe orders with each order having 6 elements and leads to six sectors.

In another example, 24 probe orders may be defined which distribute the load better when servers fail than the previous example. These probe orders may be defined as:

For xd in $\{-1, +1\}$,
For yd in $\{-1, +1\}$,
For zd in $\{-1, +1\}$,
For n in $\{0, 1, 2\}$,
rotate([(xd, 0, 0), (0, yd, 0), (0, 0, zd)], n)

This gives 24 Probe Orders (and therefore 24 sectors) because there are 2 ways of picking the xd, 2 for yd and 2 for zd=2*2*2=8 possible coordinate deltas, plus the 3 rotations of each=8*3=24 distinct probe orders. Each probe order has 3 deltas in it.

A particular sector's probe order defines in which direction to try moving in the event of server failure to find a server which is reachable. For example, the first of the 24 probe orders defined above (e.g. for sector 0) is:

[(-1,0,0), (0,-1,0), (0,0,-1)]

which means to try looking first in the negative x direction, then in the negative y direction, and finally in the negative z direction. If none of these work, then the method tries again, starting from the points just explored (which may be referred to as the SeedQueue). Eventually, (if the probe order is properly constructed), all coordinates will have been explored.

The structured key provided by the API may therefore be considered as a set of bits, some of which are interpreted as an (x,y,z) coordinate for the home server and some of which are used to identify a sector. If, in a particular example, the keys are 64-bit integers, two constants can be computed which are fixed for a particular topology:

KeysPerServer=ceil ($2^{64}$/TotalServersInNetwork)
KeysPerSector=ceil (KeysPerServer/number of ProbeOrders)

Given a key, it is then possible to compute:

Home Server=floor(key/KeysPerServer)
Remainder=key % KeysPerServer
Sector=floor(Remainder/KeysPerSector)

where a % b gives the integer remainder left over when an integer a is divided by integer b (e.g. 12% 10=2). The sector which is computed using the algorithm above then defines the probe order used to identify a responsible server for a key when the home server fails, i.e. the data which drives the fail-over policy within the cluster is within the key itself.

Figure 3:
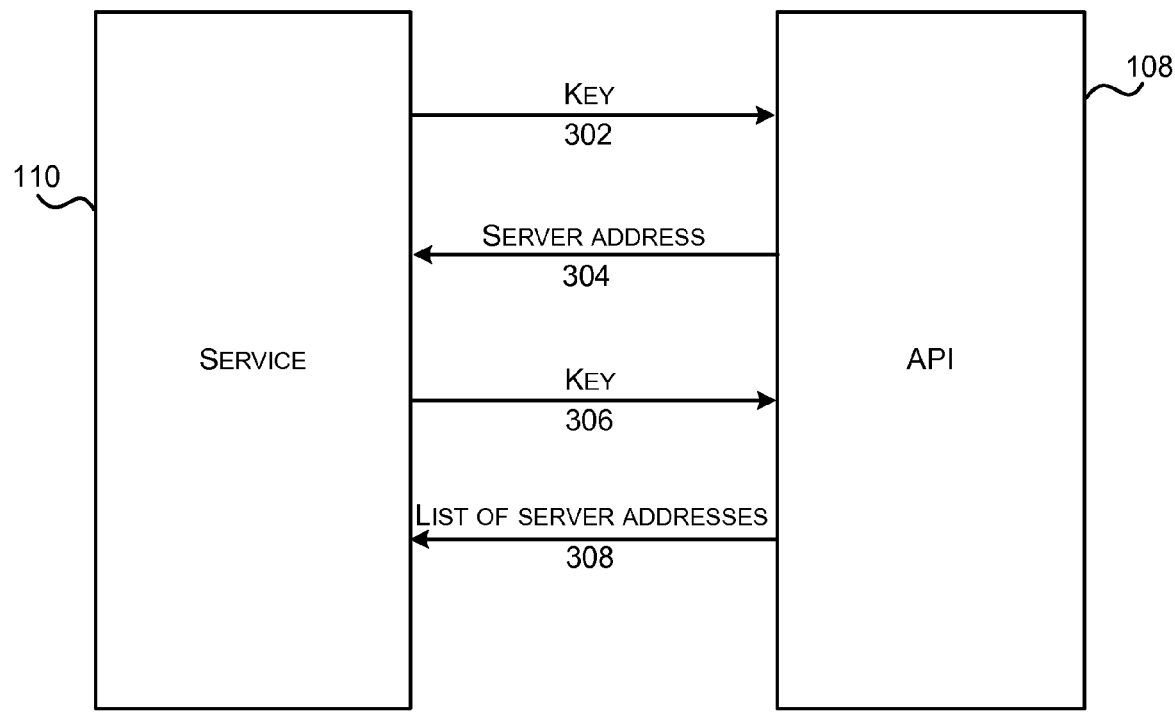

The API exposes a function to the services which returns the address for the server which is currently responsible for a key (arrow 304) in response to an input of the key (arrow 302), as shown in the schematic diagram of FIG. 3. This function uses the fail-over information in the structured key to identify the appropriate server (e.g. as described above). The following API code extract provides an example implementation of this functionality:

```
/// <summary>
/// Return the Server index which is currently deemed responsible
/// for <paramref name="key"/>. We compute reachability from the
/// current server's perspective.
/// Callable on any thread.
/// </summary>
/// <param name="key">The key (usually an item's hashcode)</param>
/// <returns>The closest server index for <paramref name="key"/> which
is
/// reachable currently.</returns>
public int GetServerForKey(UInt64 key)
```

The API call GetServerForKey(key) in the extract above is equivalent to GetKServersForKey(key, 1).

As described above, the fail-over information defines how the whole address space is explored in the event of server failure so the API may expose a function which provides a list of k server addresses (arrow 308) which are currently responsible for a particular key (provided as an input, arrow 306), as in the following example API code extract:

```
/// <summary>
/// Return a list of k Server indexes which are currently reachable, and
/// deemed responsible for "key". We compute reachability from the
/// current server's perspective, although this won't be consistent
/// in the face of network partitions, and could change as soon as we
return.
/// Throws an ApplicationException if there less than k reachable servers.
/// Callable on any thread.
/// </summary>
/// <param name="key">The key (usually an item's hashcode)</param>
/// <param name="k">Number of replicas required.</param>
/// <param name="preferredButDown">Servers which would have been
/// picked, if they were reachable.</param>
/// <returns>The "k" closest Server indexes to "key"'s HomeId</returns>
public List<int> GetKServersForKey(UInt64 key, int k,out List<int>
preferredButDown)
```

In using a probe order to identify the k server addresses, eventually all coordinates will have been explored and either k servers found or the SeedQueue will become empty which indicates that the method has been unable identify enough servers (e.g. k servers) which are alive.

The following algorithm may be used to convert from a key to a list of k server addresses, where K≥1:

```
getKServersForKey(key, K) returns [list of servers]
{
1) Compute Home Server and Sector from key.
2) If Home Server is reachable, add it to list of servers to return.
3) Does list of servers have K servers in it? If so, return the list of servers.
  If not, continue.
4) Create a SeedQueue, and add the Home Server's (x,y,z) coordinate as
  the initial item in it.
5) Set the ProbeOrder to the Probe Order for this key's Sector.
6) Repeat forever:
{
    6.1) If the SeedQueue is empty, then fail: K servers cannot be found
    which are reachable.
    6.2) Remove the first (x,y,z) coordinate from the SeedQueue, and call
    it the CurrentPoint.
    6.3) Repeat for each Delta(dx,dy,dz) in the ProbeOrder:
    {
        6.3.1) Compute the ProbePoint = CurrentPoint(x,y,z) +
        Delta(dx,dy,dz)
        6.3.2) If the ProbePoint has already been considered, ignore it.
        6.3.2) Otherwise add it to the end of the SeedQueue and, if the
        ProbePoint is reachable, then:
            6.3.2.1) add it to the list of servers to return
            else
            6.3.2.2) add it to the PreferredButDown list
        6.3.3) Does the list of servers now have K servers in it? If so,
        return the list of servers. If not, continue.
    }
}
}
```

Figure 4:
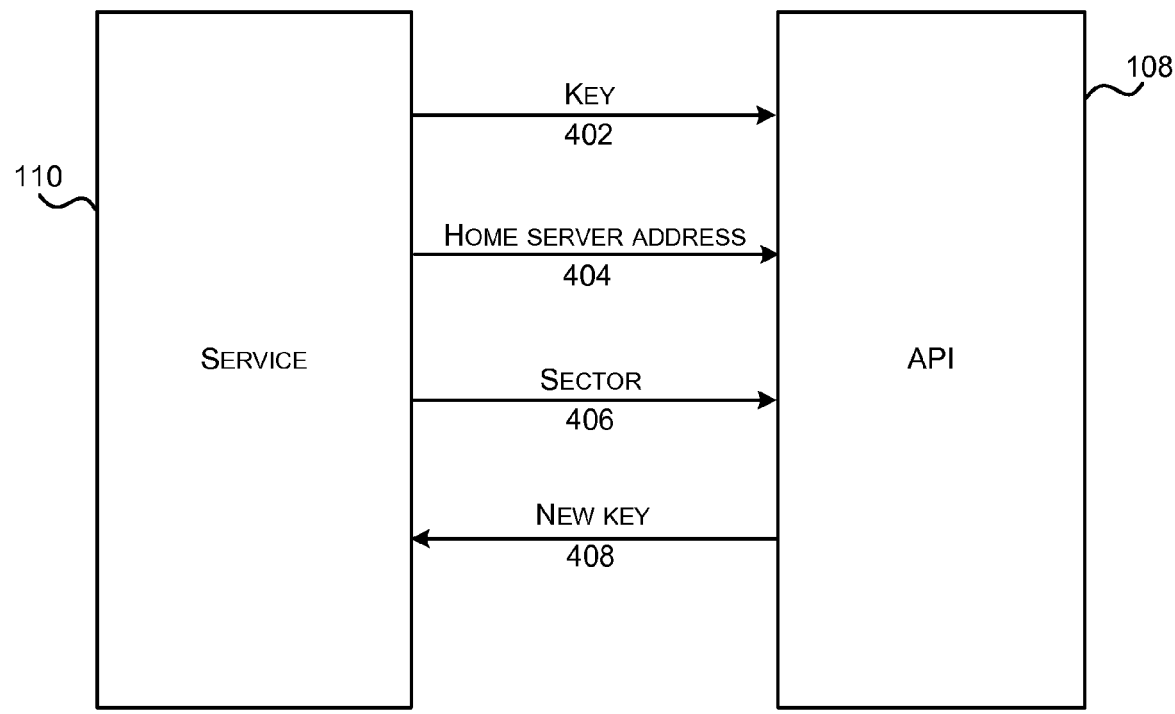

When using a random number as the key, applications have no control over the home server or failover behavior of the key. Sometimes applications need more control, for example to co-locate related keys, or to ensure related keys failover to the same backup server, or in some particular pattern. To allow for this, applications can generate new keys which are related to some existing key, but with certain modifications, as shown in the schematic diagram of FIG. 4. To generate a new key (arrow 408), the original key is passed to the API (arrow 402) along with the desired home server address for the key (arrow 404). This is shown in the following example API code extract:

```
/// <summary>
/// Construct a fresh key, identical to <paramref name="key"/>, but
/// with a home server of <paramref name="homeid"/>
/// </summary>
/// <param name="key">Base key. Should ideally be a random
/// number.</param>
/// <param name="homeid">Server index for the key's home
/// server.</param>
/// <returns>A fresh key derived from <paramref name="key"/></returns>
public static UInt64 SetHomeId(UInt64 key, ServerId homeid)
```

The API call SetHomeId in the example above is equivalent to:

int oldSector;
ServerId oldHomeId=GetHomeIdSector(key, out oldSector);
SetHomeIdSector(key, homeid, oldSector);

In some examples, the sector will also be passed to the API (arrow 406) as shown in the following example API code extract:

```
/// <summary>
/// Construct a fresh key, identical to <paramref name="key"/>, but
/// with the home server given by <paramref name="homeidx"/> and
/// the sector by <param name="sector"/param>. All keys with identical
/// homeidx and sector will be remapped the same way when servers fail.
If
/// the homeidx has failed, the key's sector is used to decide which
/// neighbors to remap the key to, allowing load to be evenly distributed.
/// </summary>
/// <param name="key">Base key. Should ideally be a random
/// number.</param>
/// <param name="homeidx">Server index for the key's home
/// server.</param>
/// <param name="sector">Sector for the key</param>
/// <returns>A fresh key derived from <paramref name="key"/></returns>
public static UInt64 SetHomeIdSector(UInt64 key, ServerId homeid, int
sector)
```

By combining fail-over information into the key, as described above, if a server fails the keys for which it was home server can be mapped onto different servers, e.g. the keys can be distributed over the set of one-hop neighbors rather than mapping all the keys for which a failed server was home onto a single other server selected from the one-hop neighbors. This method therefore maintains locality and reduces load skew.

The information which is contained within a key that can be used in the event of server failure can also be used for purposes of replication. As described above, a portion of the key specifies an ordered list of servers (as defined by the probe order) and this list can be enumerated to identify as many (e.g. k) replicas as are required. In some implementations, the way in which the coordinate space is explored to identify a list of K server addresses to be used for replication (where K>1) may be the same as for fail-over and in other implementations, a different probe order may be used for fail-over and replication. An example code extract for generating a list of K servers for a key is provided above. The following API code extract returns information on the current k replicas for a key:

```
/// <summary>
/// Returns information on the current k replicas for key.
/// Moderately heavyweight locking ensures that you get a consistent
/// snapshot of the world.
/// </summary>
/// <param name="key">Key to route to.</param>
/// <param name="k">Number of replicas to generate.</param>
/// <returns>ReplicaInfo for the k replicas.</returns>
public ReplicaInfo GetReplicaInfoForKey(UInt64 key, int k)
```

The API call GetReplicaInfoForKey(key, int k) is equivalent to:
   replicas=GetKServersForKey(key, k);
   For each rep in replicas:
   GetAllNextHopsForServer(rep)
but with stronger locking.

In order that a service can route packets to a replica, the API also exposes a function which enables services to obtain the link vector of next hops towards a specific replica of a key, as shown in the following code extract:

```
/// <summary>
/// Returns the link vector for the next hops towards a specific
/// replica for "key". Moderately heavyweight locking ensures that you get
a
/// consistent snapshot of the world.
/// </summary>
/// <param name="key">Key to route to.</param>
```

-continued

```
/// <param name="replica">Specific replica to target, e.g. 0 for the
primary, 1
/// for the first secondary, etc</param>
/// <returns>Link vector for the next hops to use</returns>
public int GetAllNextHopsForKeyReplica(UInt64 key, int replica)
```

This function requires two inputs, the key and data identifying the particular replica, which in this example is a number. This function is equivalent to GetAllNextHopsForServer (GetKServersForKey(key, replica+1)[replica]) but with stronger locking. For a replica number of zero, the function GetAllNextHopsForKeyReplica(UInt64 key, int replica) is equivalent to the GetAllNextHopsForKeyPrimary described above.

Depending upon the way that a probe order is defined, a set of K replicas may have a particular property, such as proximity to the home server and this may be beneficial because having replicas close to the home server increases throughput and reduces network traffic.

Figure 5:
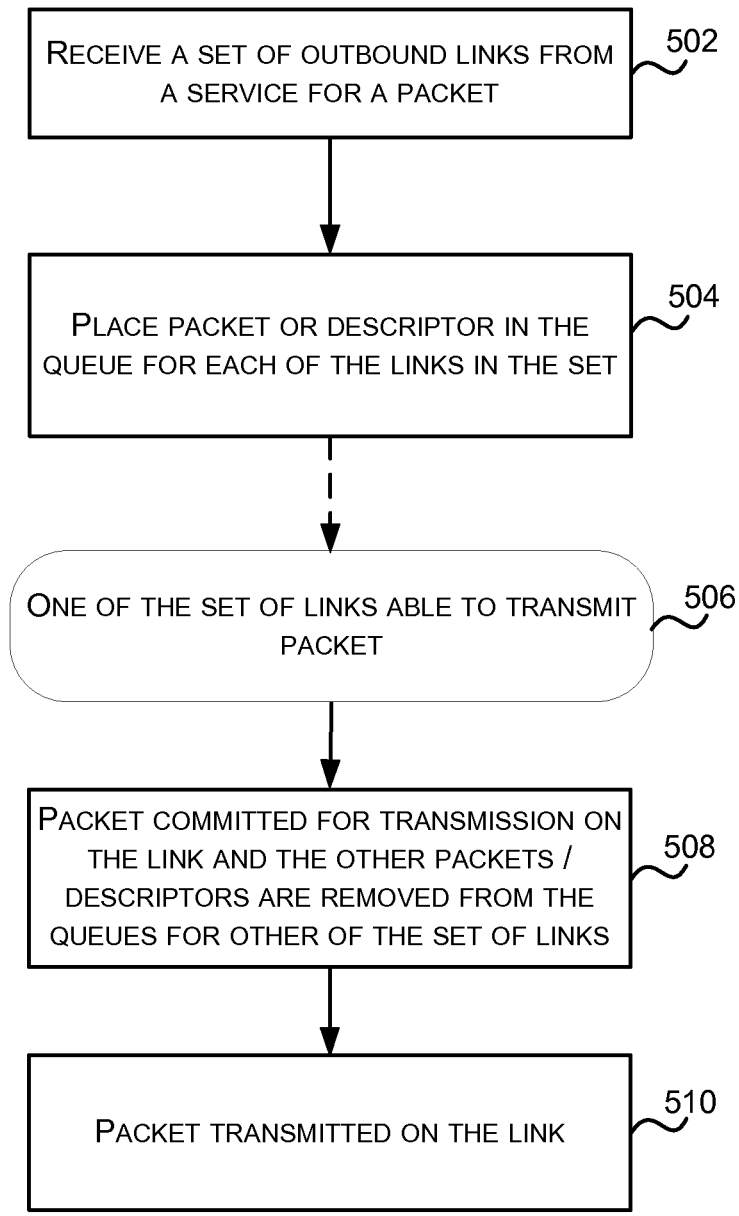
FIG. 5 is a flow diagram of a multi-hop routing method which enables a service to schedule a packet for transmission over multiple links.

In addition to providing a keyspace and exposing functions for management and use of that keyspace, the API exposes multi-hop routing functionality to services. The multi-hop routing functionality may be provided by another service on the same server or by the server platform itself. FIG. 5 is a flow diagram of a multi-hop routing method which may be referred to as a 'lazy-multi-queue' method which enables a service to schedule a packet for transmission over multiple links. According to this method a packet, or a descriptor for the packet, is queued for transmission in queues for each link in a set of links and only at the point when the packet is transmitted over one of the set of links (or committed for transmission over one of the set of links) is the packet (or associated descriptor) removed from the other queues. It is this selection of a link at the last possible moment based on the observed network conditions which gives rise to the term 'lazy' being used for this selection method.

As shown in FIG. 5, a service specifies a set of outbound links for a packet and this data identifying this set of links is provided to the API (block 502). In an example, the service may provide a link vector to the API which identifies those links on which a packet may be transmitted. The link vector may comprise an arbitrary subset of all links from a particular server and at one extreme may comprise all the links (e.g. 4 links in the first example 101 in FIGS. 1 and 6 links in the second example 102) and at the other extreme may comprise only a single link. In response to receiving this data identifying a set of links for transmission of a packet (in block 502), the packet, or a descriptor for the packet, is placed in the queue for each of the links in the set (block 504). When one of the set of links is able to transmit the packet (block 506), the packet is committed for transmission over that link and the packets/descriptors which were placed in queues for other links in the set (in block 504) are removed (block 508). The packet is then transmitted over the link (block 510).

The following API code extract provides this functionality to services:

```
/// <summary>
/// Add a packet to a given polled I/O queue for transmission. The request
///   will fail if all the specified links are at capacity otherwise, if successful
///   the packet will be queued on the specified transmission queue. In all
///   cases the caller loses ownership of the packet.
/// </summary>
/// <param name="linkVector">Bit-vector indicating links on which packet
///   may be transmitted</param>
```

```
/// <param name="packet">Packet to be transmitted, to which a valid L2
/// header will be prepended.</param>
/// <param name="txQueue">Packet queue to hold packet until platform
/// signals readiness.</param>
/// <returns>A negative error code if the request failed, otherwise the
/// remaining capacity of least-loaded link in linkVector.</returns>
public virtual int UnicastZeroCopy(int linkVector, Packet packet,
PolledIoQueue txQueue, bool releaseOnFail)
```

Information may be provided to a service via the API to enable the service to select the set of links to be used for transmission of a packet. In an example, a service may use the minimum hop count data which may be provided by the GetMinHopCountsForServer function in the API (see code extract above). The API may also be arranged to provide a service with an indication of available capacity in a given link.

The API described herein may also allow a network service to select from its set of transmission queues, in response to an indication of available capacity in a given network link, a set of packets to be transmitted on that link and an example implementation is shown in the following API extract:

```
/// <summary>
/// Called (polled) by server to obtain list of tx packets for this service.
/// </summary>
/// <param name="linkIndex">Index of the link that is polling for
/// I/O.</param>
/// <param name="maxNew">Maximum number of packets to be added to
/// the list</param>
/// <returns>List of packets.</returns>
public virtual Packet GetPolledIoPackets(int linkIndex, int maxNew)
```

This routine is called by the API to obtain up to "maxNew" packets from the queue of packets maintained by a service. By default the first "maxNew" packets from the queue for the specified link will be chosen, but a service may override this behavior by implementing its own version of the GetPolledIoPackets routine.

Another example of an API call is shown in the further extract provided below. A service may implement this routine in order to be informed by the API when a queue that was previously saturated is now below its maximum capacity.

```
/// <summary>
/// Called to indicate non-zero capacity available on a set of previously
/// saturated links.
/// </summary>
/// <param name="linkVector">Link vector of links just
/// unblocked.</param>
public virtual void OnTransmitQueueUnblocked(int linkVector) { }
```

The API may also expose link or server failures to applications (112 in FIG. 1) via services. In some implementations, only local link failures may be exposed and in other implementations all link failures within the cluster may be exposed. The following three extracts from example API code can be used to expose this information:

```
/// <summary>
/// Function prototype to be called when servers become un/reachable.
/// The two lists give a consistent snapshot of which servers came up,
/// and which went down, but note that this information is stale, i.e.
/// the servers may no longer be in the state reported.
/// </summary>
/// <param name="upServerIndexes">Server indexes which were down,
and
/// came up.</param>
/// <param name="downServerIndexes">Server indexes which were up,
but
/// went down.</param>
public delegate void ReachabilityChangedHandler(List<int>
upServerIndexes, List<int> downServerIndexes);
/// <summary>
/// This event is fired whenever one or more servers have changed
/// their reachability status: either they've become reachable, or
/// unreachable.
/// The list contains only and all the servers which have changed state since
/// the last event was fired, with no duplicates. Called on arbitrary thread
/// with no locks held.
/// </summary>
public event ReachabilityChangedHandler ReachabilityChanged;
/// <summary>
/// Called by server to indicate a change in the status of an immediate
/// neighbor.
/// </summary>
/// <param name="neighbor">Server index of the neighbor whose state has
/// changed.</param>
/// <param name="online">Whether the neighbor has gone online or
/// offline.</param>
public virtual void OnNeighborChanged(int neighborIndex, bool online)
```

These functions allow services to react to and recover from server failures, for example restarting computations, or re-synchronizing data, as necessary. For example, a bulk transport service can subscribe to neighbor changed events to guide its selection of outbound links.

Figure 6:
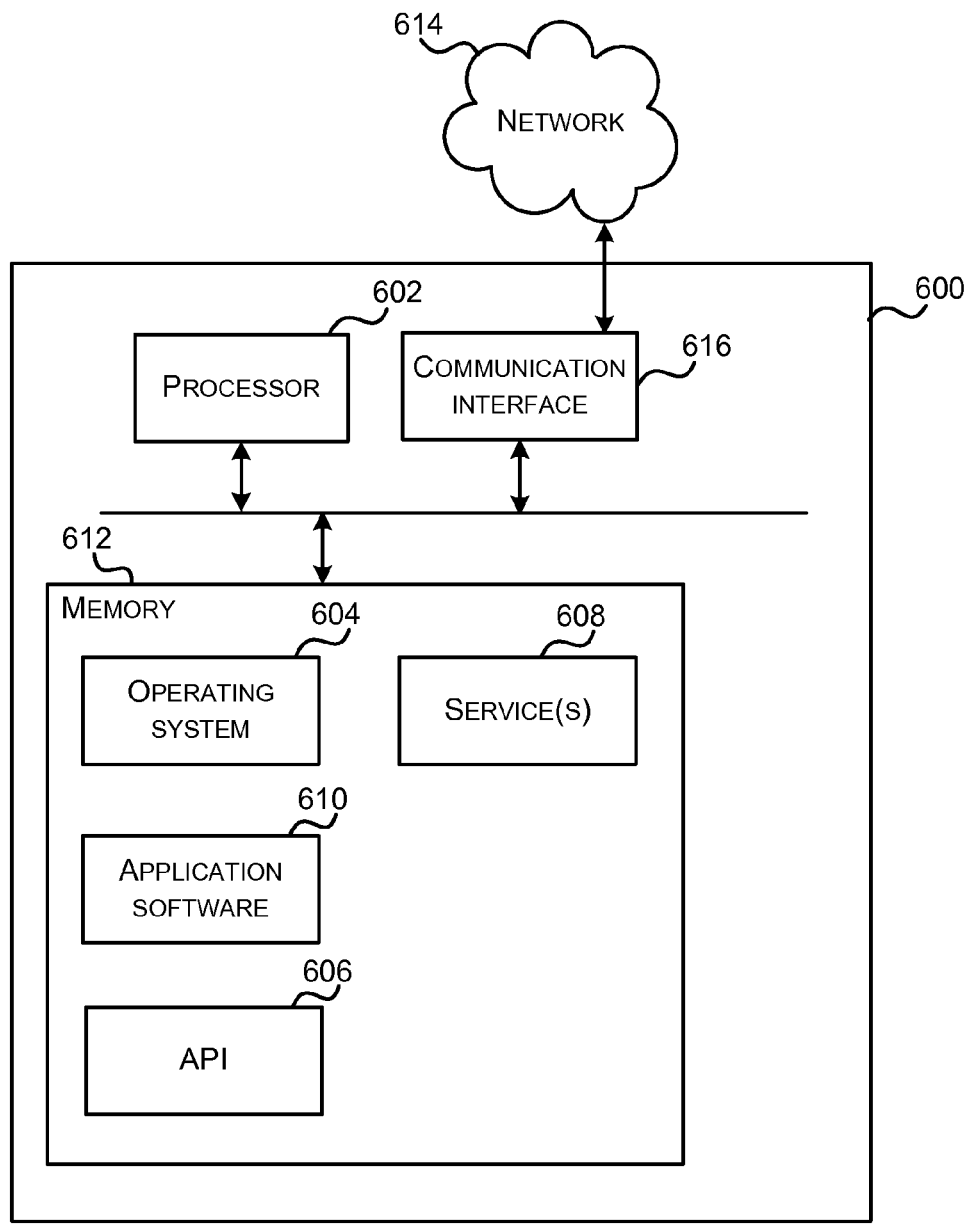
FIG. 6 illustrates an exemplary computing-based device in which embodiments of the API may be implemented.

FIG. 6 illustrates various components of an exemplary computing-based device 600 which may be implemented as any form of a computing and/or electronic device, and in which embodiments of the API may be implemented.

Computing-based device 600 comprises one or more processors 602 which may be microprocessors, controllers or any other suitable type of processors for processing computing executable instructions to control the operation of the device in order to implement an API as described herein. In some examples, for example where a system on a chip architecture is used, the processors 602 may include one or more fixed function blocks (also referred to as accelerators) which implement a part of the API or methods described herein in hardware (rather than software or firmware). Platform software comprising an operating system 604 or any other suitable platform software may be provided at the computing-based device to enable the API 606, services 608 and application software 610 to be executed on the device.

The computer executable instructions may be provided using any computer-readable media that is accessible by computing based device 600. Computer-readable media may include, for example, computer storage media such as memory 612 and communications media. Computer storage media, such as memory 612, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 612) is shown within the computing-based device 600 it will be appreciated that the storage may be distributed or located remotely and accessed via a network 614 or other communication link (e.g. using communication interface 616).

The communication interface 616 may comprise a plurality of ports (e.g. gigabit Ethernet ports) in order to directly connect computing-based device 600 to one or more other computing-based devices within a cluster of computing-based devices. In some examples, the communication interface 616 may also comprise one or more ports for connecting the computing-based device 600 to other devices which do not form part of the cluster and this connection may be via a different network (e.g. an IP packet-switched based network).

In many embodiments, the computing-based device 600 may run without display or keyboard, however, in some implementations, the computing-based device 600 may also comprises an input/output controller (not shown in FIG. 6) arranged to output display information (e.g. a graphical user interface) to a display device which may be separate from or integral to the computing-based device 600. The input/output controller may also be arranged to receive and process input from one or more devices, such as a user input device (e.g. a mouse or a keyboard).

Examples of the API described above allows packets to be queued for transmission against multiple physical network links until such time as one of those links signals that it has capacity available. At this time one or more packets are removed from the queue and committed for transmission on that link. In addition examples of the API include routing functionality, supported for example by a link-state routing protocol, that determines which link or links should be used to send a packet towards a given destination coordinate or key given the prevalent state of the cluster of servers.

The keys described above may define things including the server address and these are all encoded in a single flat address space. In some examples, the key may also define one or more of: a fail-over policy and a replication policy and these policies may be the same or different. Where fail-over and/or replication information is encoded within a key, each server within a cluster can perform the same computations and achieve the same results. Consequently all servers agree on which server is the primary server for a key at a particular time and where replication is used, each server knows where the replicas are held.

Although the present examples are described and illustrated herein as being implemented in a system as shown in FIG. 1, the system described is provided as an example and not a limitation. As those skilled in the art will appreciate, the present examples are suitable for application in a variety of different types of systems with a direct-connect topology. The system may support arbitrary workload and applications.

It will be appreciated that the API code extracts provided above are by way of example only and alternative implementations may be used. In a simple example variation of the code shown above, unsigned integers may be used instead of integers.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer implemented method for implementing an application programming interface for allowing communication between servers in a direct-connect topology, the method comprising:
receiving one of a key and a server address from a service running on a server; and
returning a set of link indices to the service, each link index in the set of link indices identifying a candidate next hop to a destination defined by the received key or server address,
and wherein a portion of a key encodes an address of a home server responsible for the key, responsibility for the key being alterable to a different server, and the key further encodes fail-over information for computing an address of at least one alternative server responsible for the key for use when the home server is unreachable, the fail-over information being encoded such that all keys from the unavailable home server are mapped to at least two different servers.

2. A method according to claim 1, wherein the set of link indices comprises a vector of link indices.

3. A method according to claim 1, further comprising:
receiving one of a key and a server address from a service running on a server; and
returning a set of hop counts to the service, each hop count corresponding to a link index in the set of link indices and comprising a minimum number of hops between servers in the direct-connect topology to reach the destination starting with the candidate next hop specified by the link index.

4. A method according to claim 1, wherein the key further encodes fail-over information for computing an address of at least one alternative server responsible for the key for use when the home server is unreachable.

5. A method according to claim 4, further comprising:
receiving a key from a service running on a server; and
returning at least one address of a reachable server responsible for the key.

6. A method according to claim 5, wherein returning at least one address of a reachable server responsible for the key comprises returning an ordered list of addresses of k servers responsible for the key, where k is an integer.

7. A method according to claim 1, wherein the key further encodes replication information which identifies an ordered list of server addresses for use in replication.

8. A method according to claim 7, further comprising:
receiving a key from a service running on a server; and
returning an ordered list of k server addresses, where k is an integer.

9. A method according to claim 1, further comprising:
receiving, from a service running on a server, data identifying a set of outbound links for use in transmitting a packet from the server to a destination server;
placing one of the packet and a descriptor for the packet in a queue associated with each of the outbound links in the set of outbound links; and
once the packet is committed for transmission over one of the set of outbound links, removing the packet or descriptor from the queues associated with each of the other outbound links in the set of outbound links.

10. A method according to claim 9, further comprising:
providing data on failures of at least one of links and servers within at least a portion of the direct-connect topology to a service running on a server.

11. A system adapted to instantiate an application programming interface (API) configured to expose a programming interface for allowing communication between servers in a direct-connect topology the system comprising:
a processor; and
a memory communicatively coupled to the processor, the memory having stored therein computer-executable instructions implementing the API and which, when executed, cause the processor to:
returning a set of link indices to a service running on a server in response to receiving one of a key and a server address from the service, each link index in the set of link indices identifying a candidate next hop to a destination defined by the received key or server address,
and wherein the key encodes an address of a home server responsible for that key and information for generating an ordered list of alternative server addresses, responsibility for the key being alterable to a different server, and the key further encodes fail-over information for computing an address of at least one alternative server responsible for the key for use when the home server is unreachable, the fail-over information being encoded such that all keys from the unavailable home server are mapped to at least two different servers.

12. A system according to claim 11, wherein the ordered list of alternative server addresses comprises alternative home servers for use if the home server is unreachable.

13. A system according to claim 11, the memory further having stored therein computer-executable instructions which, when executed, cause the processor, in response to receiving from a service running on a server, data identifying a set of outbound links for use in transmitting a packet from the server to a destination server, to:
place one of the packet and a descriptor for the packet in a queue associated with each of the outbound links in the set of outbound links; and
once the packet is committed for transmission over one of the set of outbound links, removing the packet or descriptor from the queues associated with each of the other outbound links in the set of outbound links.

14. A computer storage medium, the computer storage medium being hardware and having computer-readable instructions that when executed by a processor cause the processor to perform actions implementing an application programming interface for allowing communication between servers in a direct-connect topology, the actions comprising:
receiving one of a key and a server address from a service running on a server; and
returning a set of link indices to the service, each link index in the set of link indices identifying a candidate next hop to a destination defined by the received key or server address,
and wherein a portion of a key encodes an address of a home server responsible for the key, responsibility for the key being alterable to a different server, and the key further encodes fail-over information for computing an address of at least one alternative server responsible for the key for use when the home server is unreachable, the fail-over information being encoded such that all keys from the unavailable home server are mapped to at least two different servers.

15. A computer storage medium according to claim 14, wherein the set of link indices comprises a vector of link indices.

16. A computer storage medium according to claim 14, the actions further comprising:
   receiving one of a key and a server address from a service running on a server; and
   returning a set of hop counts to the service, each hop count corresponding to a link index in the set of link indices and comprising a minimum number of hops between servers in the direct-connect topology to reach the destination starting with the candidate next hop specified by the link index.

17. A computer storage medium according to claim 14, the actions further comprising:
   receiving a key from a service running on a server; and
   returning at least one address of a reachable server responsible for the key.

18. A computer storage medium according to claim 17, wherein returning at least one address of a reachable server responsible for the key comprises returning an ordered list of addresses of k servers responsible for the key, where k is an integer.

19. A computer storage medium according to claim 14, wherein the key further encodes replication information which identifies an ordered list of server addresses for use in replication.

* * * * *